US012105331B2

(12) United States Patent
Budnicki et al.

(10) Patent No.: US 12,105,331 B2
(45) Date of Patent: Oct. 1, 2024

(54) DEVICE AND METHOD FOR TRANSPORTING PULSED LASER RADIATION WITH A HOLLOW CORE OPTICAL FIBER

(71) Applicant: TRUMPF Laser GmbH, Schramberg (DE)

(72) Inventors: Aleksander Budnicki, Waldkirch (DE); Stefan Baumbach, Oberwolfach (DE)

(73) Assignee: TRUMPF LASER GMBH, Schramberg (DE)

( * ) Notice: Subject to any disclaimer, the term of this patent is extended or adjusted under 35 U.S.C. 154(b) by 265 days.

(21) Appl. No.: 17/714,155

(22) Filed: Apr. 6, 2022

(65) Prior Publication Data

US 2022/0229248 A1 Jul. 21, 2022

Related U.S. Application Data

(63) Continuation of application No. PCT/EP2020/078500, filed on Oct. 9, 2020.

(30) Foreign Application Priority Data

Oct. 11, 2019 (DE) ..................... 10 2019 127 422.2

(51) Int. Cl.
  *G02B 6/42* (2006.01)
  *G02B 6/032* (2006.01)
  *H01S 3/00* (2006.01)
(52) U.S. Cl.
  CPC ........... *G02B 6/4206* (2013.01); *G02B 6/032* (2013.01); *H01S 3/0057* (2013.01)
(58) Field of Classification Search
  None
  See application file for complete search history.

(56) References Cited

U.S. PATENT DOCUMENTS 4,918,751 A 4/1990 Pessot et al.
5,312,396 A 5/1994 Feld et al.
(Continued)

FOREIGN PATENT DOCUMENTS

CN 103329016 A 9/2013
DE 102016116410 A1 3/2017
(Continued)

OTHER PUBLICATIONS

Baumbach, S., et al. "Ultrashort pulse delivery at high average power with low-loss hollow core fibers coupled to TRUMPF's TruMicro laser platforms for industrial applications," Frontiers in Ultrafast Optics: Biomedical, Scientific, and Industrial Applications XVII, Proc. of SPIE, vol. 10094, 100941H, Feb. 17, 2017, International Society for Optics and Photonics, San Francisco, California, United States.

*Primary Examiner* — Jerry Rahll
(74) *Attorney, Agent, or Firm* — LEYDIG, VOIT & MAYER, LTD.

(57) ABSTRACT

A device for transporting pulsed laser radiation includes a pulse duration setting device configured for setting a transport pulse duration of the pulsed laser radiation. the device further includes a hollow core optical fiber having a hollow core surrounded by a material. The hollow core optical fiber is configured to be operated with beam path parameter values that are present at the first fiber end and lie in a target tolerance range. The device further includes a fiber input coupling device configured to couple the pulsed laser radiation into the hollow core optical fiber with the beam path parameter values that lie in the target tolerance range. the transport pulse duration is set so that input coupling of the pulsed laser radiation into the hollow core is provided for all of the beam path parameter values in the target tolerance range.

16 Claims, 4 Drawing Sheets

(56) References Cited

U.S. PATENT DOCUMENTS

| | | | |
|---|---|---|---|
| 5,862,287 | A | 1/1999 | Stock et al. |
| 7,813,035 | B2 | 10/2010 | Liu |
| 8,310,749 | B2 | 11/2012 | Mottay et al. |
| 8,848,748 | B2 | 9/2014 | Cho et al. |
| 9,590,386 | B2 | 3/2017 | Harter et al. |
| 11,205,883 | B2 | 12/2021 | Budnicki et al. |
| 2006/0146898 | A1 | 7/2006 | Tauser et al. |
| 2010/0309545 | A1 | 12/2010 | Zaouter et al. |
| 2011/0002691 | A1 | 1/2011 | Lin |
| 2012/0082410 | A1* | 4/2012 | Peng .................. G02B 6/024 385/11 |
| 2014/0300951 | A1 | 10/2014 | Messerly et al. |
| 2017/0179666 | A1 | 6/2017 | Klenke et al. |
| 2018/0059508 | A1 | 3/2018 | Knappe |

FOREIGN PATENT DOCUMENTS

| | | |
|---|---|---|
| DE | 102016110947 A1 | 12/2017 |
| WO | WO 2010060443 A1 | 6/2010 |

* cited by examiner

DEVICE AND METHOD FOR TRANSPORTING PULSED LASER RADIATION WITH A HOLLOW CORE OPTICAL FIBER

CROSS REFERENCE TO RELATED APPLICATIONS

This application is a continuation of International Application No. PCT/EP2020/078500 (WO 2021/069716 A1), filed on Oct. 9, 2020, and claims benefit to German Patent Application No. DE 10 2019 127 422.2, filed on Oct. 11, 2019. The aforementioned applications are hereby incorporated by reference herein.

FIELD

Embodiments of the present invention relate to a device and a method for transporting high-power laser pulses with a hollow core optical fiber.

BACKGROUND

In conventional optical fibers such as step-index solid core optical fibers, the guidance of laser radiation can be influenced by a possible interaction between the laser light and the fiber material. In particular, damage to the fiber material that is caused by the interaction limits the maximum pulse energy and pulse power that can be transported, with the result that it is not possible to use solid core fibers in the case of highly intensive laser radiation, in particular in the case of high-power laser pulses. High-power laser pulses are understood herein to mean so-called ultra-short pulses with pulse durations in the range of from a few femtoseconds (fs) to a few hundred picoseconds (ps) and with pulse energies in the range of microjoules (µJ) to millijoules (mJ). High-power laser pulses can be formed in various spectral ranges, for example in the IR spectral range, green spectral range, UV spectral range, deep UV spectral range.

SUMMARY

Embodiments of the present invention provide a device for transporting pulsed laser radiation. The device includes a pulse duration setting device configured for setting a transport pulse duration of the pulsed laser radiation. The device further includes a hollow core optical fiber having a hollow core surrounded by a material. The hollow core optical fiber is configured to be operated with beam path parameter values that are present at the first fiber end and lie in a target tolerance range. The device further includes a fiber input coupling device configured to couple the pulsed laser radiation into the hollow core optical fiber with the beam path parameter values that lie in the target tolerance range. the transport pulse duration is set so that input coupling of the pulsed laser radiation into the hollow core is provided for all of the beam path parameter values in the target tolerance range.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1A:
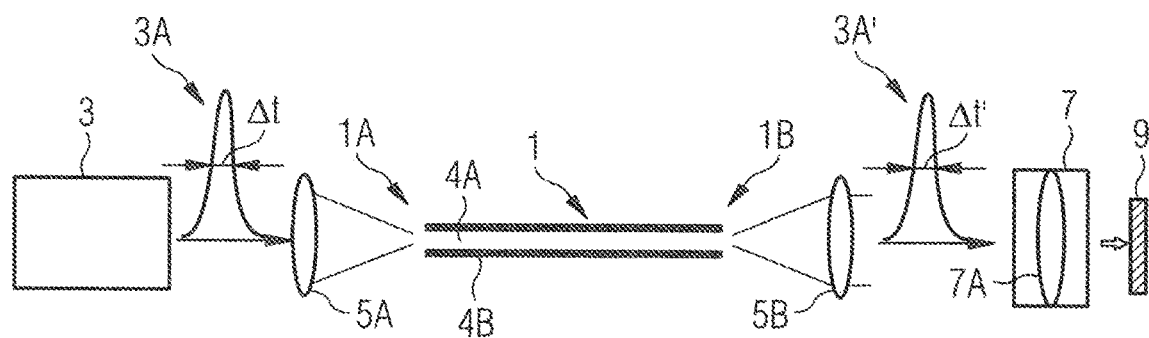
FIG. 1A shows a schematic illustration for elucidating an input coupling of pulsed laser radiation into a hollow core fiber for beam path parameters in the tolerance range.

One aspect of the present invention enables high-power laser pulses to be transported by a hollow core fiber while maintaining a sufficient tolerance window with regard to the input coupling of the laser radiation into the hollow core fiber.

An interaction with the material of a fiber that can cause damage to the fiber can be avoided or at least reduced with optical fibers having a hollow fiber core in which the highly intensive laser radiation propagates. Accordingly, hollow core fibers and in particular also hollow core photonic crystal fibers (HCPCFs) are suitable for transporting high-power laser pulses. Such fibers have light guiding regions in which laser pulses with pulse durations in the nanoseconds to femtoseconds range can be transported. In the light guiding regions, the peak intensities are not present in the material of the fiber, but rather in regions that are substantially free of solids. Filling the hollow core with e.g. air or nitrogen or evacuation can furthermore allow adaptation of the optical properties of a fiber, for example the nonlinearity thereof.

The embodiments described below concern in particular the transport of laser pulses by hollow core optical fibers (also referred to as hereinafter as hollow core fibers or hollow fibers for short) such as the HCPCFs. In the case of an HCPCF, the hollow core guiding the laser radiation is surrounded by a photonic "crystal" structure. The photonic structure is designed in such a way that coupling of the light from the hollow core into the photonic structure is optically suppressed or not possible, with the result that the laser radiation remains "trapped" in the hollow core. This kind of light guiding depending on fiber type is also known by the designations "photonic bandgap guiding" or "inhibited coupling" or "anti-resonant guiding". Exemplary fiber types include inhibitor coupling (IC) HCPCFs (e.g. HCPCFs of the Kagome type or of the hypocycloid-core Kagome type) or bandgap HCPCFs.

The transition between the hollow core and the photonic structure is formed by an (innermost) core wall structure. If laser radiation is coupled into the hollow core fiber, usually during transport only a low intensity is present in the region of the core wall structure; the main portion of the power is kept in the center of the hollow core by the design of the fiber.

Generally, for a good efficiency of the light guiding by a fiber, it is important to adapt the beam propagation parameters of the laser radiation to be coupled in, such as spot size and divergence, to the fiber parameters.

In addition, the relative position of the beam path in relation to the fiber end into which radiation is coupled is important. That is to say that, for good input coupling into a hollow core fiber, the beam path of the laser radiation is to be adapted to the subsequent course of the light guiding region of the fiber in terms of location (beam center position) and angle of incidence in relation to the fiber end. Beam center position and angle of incidence are also referred to herein as beam path parameters.

For the input coupling, a so-called tolerance range for the beam path parameters arises for optical fibers. The tolerance range relates to the position of the beam center and the angle of incidence of the incident laser radiation and specifies a location and angle of incidence range in which a focused laser beam is permitted to be incident on the fiber, without the fiber incurring damage. Permissible location ranges of the beam center and angle of incidence ranges lie e.g., depending on the fiber type, in the range of ±5% to ±10% of the mode field diameter and in the range of ±5% to ±10% of the beam divergence.

A fiber input coupling device is usually used in order to set the correct beam path alignment required for the input coupling. The alignment concerns for example the positioning of an input coupling lens in relation to the light guiding region. In this regard, a misalignment of the input coupling lens with respect to the light guiding region can impair the input coupling efficiency. During operation, the beam path (beam center and angle of incidence) is to be kept as stationary as possible in relation to the fiber end; that is to say that the beam path parameters in the input coupling region are intended to lie within the tolerance range.

After the laser radiation has been transported by the fiber, the laser radiation emerging from the fiber is fed to the downstream optical components by a fiber output coupling device.

In one aspect, a device for transporting pulsed laser radiation with a pulse energy which, in the case of a compressed pulse duration, leads to highly intensive laser pulses (3C) comprises:
  a pulse duration setting device configured for receiving the pulsed laser radiation and for setting a transport pulse duration of the laser radiation,
  a hollow core optical fiber having a hollow core surrounded by material, wherein the hollow core optical fiber transports laser pulses that are coupled in at a first fiber end in the hollow core to a second fiber end and outputs them there, and wherein furthermore operating the hollow core optical fiber with beam path parameter values which are present at the first fiber end and which lie in a target tolerance range is provided, and
  a fiber input coupling device designed to receive the laser radiation set to the transport pulse duration and to couple it into the hollow core optical fiber with beam path parameter values which lie in the target tolerance range.

In this case, the transport pulse duration is set in such a way that input coupling of the laser radiation into the hollow core in which the material and/or a structure of the hollow core optical fiber are/is maintained is provided for (all) beam path parameter values in the target tolerance range.

In a further aspect, a system for providing highly intensive laser pulses for the material processing of a workpiece comprises a laser pulse source, which is designed to output laser pulses with a spectral width and a pulse energy required for the material processing as pulsed laser radiation and comprises a device as described above for transporting the pulsed laser radiation comprising a hollow core optical fiber and a pulse duration setting device, and a laser processing head, which focuses laser pulses emerging from the hollow core optical fiber onto the workpiece for the purpose of material processing. In some embodiments, the pulse duration setting device of the device for transporting the pulsed laser radiation can be configured as a separate component assigned to the hollow core fiber or as part of the laser pulse source (a pulse duration stretching device or (non-maximally compressing) pulse duration compression device arranged there).

In a further aspect, a method for transporting pulsed laser radiation of a laser pulse source with a hollow core optical fiber having a hollow core surrounded by a material, wherein the hollow core optical fiber (1) is configured to transport the laser radiation in the hollow core from a first fiber end to a second fiber end, comprises the following steps:
  generating the pulsed laser radiation comprising laser pulses with an initial pulse duration,
  setting a peak power of the pulsed laser radiation which is present at the first fiber end, and
  coupling the pulsed laser radiation into the hollow core optical fiber,
  wherein the peak power is set by the lengthening of the pulse duration from the initial pulse duration to a transport pulse duration or by non-maximum compression of the laser pulses in such a way that an input coupling of laser pulses with the transport pulse duration into the hollow core in which the material and/or a structure of the hollow core optical fiber are/is maintained is effected for beam path parameter values at the first fiber end which lie in a target tolerance range provided for operation of the hollow core optical fiber.

In some developments of the device, the target tolerance range can be provided by fluctuations of beam parameters of the pulsed laser radiation that are to be tolerated during operation. In this case, the beam parameters can comprise in particular a beam center position and/or an angle of incidence. A fluctuation to be tolerated in the beam center position can be a few percent of the mode field diameter, for example in the range of ±1%, ±2%, ±5% or ±10% of the mode field diameter and/or a fluctuation to be tolerated in the angle of incidence can be a few percent of the beam divergence, for example in the range of ±1%, ±2%, ±5% or ±10% of the beam divergence. Furthermore, the hollow core optical fiber in the target tolerance range can be able to be assigned a maximum peak pulse power, above which an input coupling without damage to the hollow core optical fiber is not provided over the entire target tolerance range. Accordingly, the transport pulse duration of the laser radiation is set at the first fiber end in such a way that a peak power of the laser radiation at the first fiber end is less than or equal to the maximum peak pulse power.

In some developments, the hollow core optical fiber can have structural elements, in particular a glass structure or a photonic crystal structure, which form an inner core wall surrounding the hollow core. The pulse duration setting device and the fiber input coupling device can be designed in such a way that a spatial overlap of an intensity distribution of the laser radiation with the structural elements in the case of beam path parameter values within the target tolerance range, and in particular at limit values of the target tolerance range, is such that an intensity present in the region of the structural elements lies below a destruction threshold intensity of the core wall.

In some developments, the pulse duration setting device as a pulse duration stretching device can be designed to lengthen laser pulses of the pulsed laser radiation which have an initial pulse duration by a stretching factor to the transport pulse duration by means of at least one optical element and to output them as temporally stretched laser pulses.

Optionally, the pulse duration setting device can comprise, used in transmission or in reflection, a diffraction grating, a volume Bragg grating, a prism, a grating prism and/or a dispersive mirror.

In some embodiments, the transport pulse duration can be set by the pulse duration setting device in such a way that, with regard to the material of the hollow core optical fiber, a damage-free input coupling into the hollow core optical fiber in the target tolerance range is effected.

Alternatively or supplementarily, the pulse duration setting device embodied as a pulse duration stretching device can be designed to lengthen an initial pulse duration in the range of 50 fs to 1 ps with a stretching factor of at least 1.5, in particular of at least 10 or at least 100, to the transport pulse duration.

In some developments, the pulse duration setting device as a pulse duration compression device can be designed to compress laser pulses of the pulse duration setting device in terms of the pulse duration (only) to the transport pulse duration.

In some developments, the pulse duration setting device as a pulse duration compression device can be designed to the effect that laser pulses of a pulsed laser radiation which are output by a laser amplifier system with a pulse duration which is significantly longer than a minimum possible pulse duration in relation to a spectral bandwidth present are temporally compressed in terms of the pulse duration to the transport pulse duration by means of at least one optical element and are thus output in particular as laser pulses stretched temporally in relation to the minimum possible pulse duration. Optionally, the pulse duration setting device can furthermore be designed to the effect that the laser pulses, in relation to the minimum possible pulse duration in the range of 50 fs to 1 ps, are set in terms of their pulse duration to the transport pulse duration with a stretching factor of at least 1.5, in particular of at least 10 or at least 100. Moreover, an additional safety factor of at least 2, 10 or 100 can be included in the determination of the transport pulse duration.

In some embodiments, beam parameters of the pulsed laser radiation can comprise parameters of the following groups:
  beam propagation parameters comprising mode field diameter, aperture angle and beam quality value,
  pulse parameters comprising pulse energy, pulse duration and repetition rate, and
  the beam path parameters comprising a beam center position at the first fiber end and a direction of incidence of the pulsed laser radiation to the first fiber end.

In this case, a peak power of the pulsed laser radiation can be adapted with the aid of the pulse duration setting device in such a way that, in the case of fixedly set beam propagation parameters and fixedly set pulse parameters, an input coupling of the laser radiation into the hollow core with beam path parameters lying in the target tolerance range is able to be carried out in a manner free of damage.

In some embodiments of the system, the laser pulse source can comprise a laser amplifier system and a pulse duration compression device.

In some embodiments of the system, the laser processing head can have a pulse duration adapting device which is configured for shortening the transport pulse duration to a processing pulse duration. Optionally, said laser processing head can comprise, used in transmission or in reflection, at least one diffraction grating, a volume Bragg grating, a prism, a grating prism and/or a dispersive mirror.

In some embodiments of the system, the device for transporting the pulsed laser radiation can be set in such a way that, without lengthening of the initial pulse duration, the pulse energy at the first fiber end leads to a peak power that causes damage to the hollow core optical fiber. In some embodiments of the system, the device for transporting the pulsed laser radiation can be set in such a way that, in the case of a dispersively maximum possible compression of the laser pulses, the pulse energy at the first fiber end leads to a peak power that causes damage to the hollow core optical fiber. Damage can generally occur in the case of a compression to a pulse duration shorter than the transport pulse duration.

In some developments, the method can furthermore comprise the following steps:
  determining a maximum peak pulse power for an input coupling with beam path parameter values in the entire target tolerance range, and
  setting the transport pulse duration in such a way that the peak power of the pulsed laser radiation, in particular of the laser pulses, is less than or equal to the maximum peak pulse power.

In some embodiments of the method, the lengthening of the pulse duration from the initial pulse duration to the transport pulse duration can be based on a stretching factor of at least 1.5, in particular of at least 10 or 100, and optionally an additional safety stretching factor of at least 2, 10 or 100. The coupling of the laser pulses into the hollow core optical fiber can be effected by a fiber input coupling device which provides a beam path for the pulsed laser radiation, said beam path providing beam path parameter values in the target tolerance range at the first fiber end for damage-free input coupling into the hollow core optical fiber with the transport pulse duration.

In some developments, the method can furthermore comprise the following steps:
  coupling the pulsed laser radiation out of the hollow core optical fiber,
  shortening the pulse duration of laser pulses of the pulsed laser radiation coupled out of the hollow core optical fiber from the transport pulse duration to a processing pulse duration, and
  focusing the coupled-out pulsed laser radiation for the purpose of providing highly intensive laser pulses for the material processing of a workpiece.

In a further aspect—which can be developed in particular in accordance with the embodiments summarized above—a device for transporting pulsed laser radiation with a pulse energy which, in the case of a compressed pulse duration, leads to highly intensive laser pulses is disclosed. The apparatus comprises a pulse duration compression device configured for receiving the pulsed laser radiation and for setting a transport pulse duration of the laser radiation, wherein the pulse duration compression device is designed to compress laser pulses of the pulsed laser radiation in terms of the pulse duration to the transport pulse duration. Furthermore, the device comprises a hollow core optical fiber having a hollow core surrounded by material, wherein the hollow core optical fiber transports laser pulses that are coupled in at a first fiber end in the hollow core to a second fiber end and outputs them there. Operating the hollow core optical fiber with beam path parameter values which are present at the first fiber end and which lie in a target tolerance range is provided. Furthermore, the device comprises a fiber input coupling device designed to receive the laser radiation set to the transport pulse duration and to couple it into the hollow core optical fiber with beam path parameter values which lie in the target tolerance range. In this case, the transport pulse duration is set in such a way that input coupling of the laser radiation into the hollow core in which the material and/or a structure of the hollow core optical fiber are/is maintained is provided for all beam path parameter values in the target tolerance range.

In a further aspect—which can be developed in particular in accordance with the embodiments summarized above—a device for transporting pulsed laser radiation with a pulse energy which, in the case of a compressed pulse duration, leads to highly intensive laser pulses is disclosed. The device comprises a pulse duration setting device configured for receiving the pulsed laser radiation and for setting a transport pulse duration of the laser radiation, wherein the pulse duration setting device as a pulse duration compression device is designed to compress laser pulses of the pulsed laser radiation in terms of the pulse duration to the transport pulse duration. Furthermore, the device comprises a hollow core optical fiber having a hollow core surrounded by material, wherein the hollow core optical fiber transports laser pulses that are coupled in at a first fiber end in the hollow core to a second fiber end and outputs them there. Operating the hollow core optical fiber with beam path parameter values which are present at the first fiber end and which lie in a target tolerance range is provided. Furthermore, the device comprises a fiber input coupling device designed to receive the laser radiation set to the transport pulse duration and to couple it into the hollow core optical fiber with beam path parameter values which lie in the target tolerance range. In this case, the transport pulse duration is set in such a way that input coupling of the laser radiation into the hollow core in which the material and/or a structure of the hollow core optical fiber are/is maintained is provided for all beam path parameter values in the target tolerance range.

The discussions in the introduction in respect of the alignment of the beam path within the scope of the tolerance range also apply to hollow core fibers. In the case of hollow core fibers, drifting of the beam path of the laser radiation can have the effect that laser radiation impinges on the photonic structure outside the hollow core region and the photonic structure is thus exposed to intensive regions of the laser beam to an increased extent. As a result, the photonic structure can be damaged or destroyed in the case of excessively high peak powers. In particular, a region of the core wall structure, which is essentially responsible for the light guiding, can be damaged, as a result of which ultimately the fiber can lose its suitability for transporting laser radiation.

Accordingly, usually for such a fiber-based arrangement for transporting pulsed laser radiation, in particular for an input coupling of pulsed laser radiation with predefined parameters (such as pulse energy, pulse duration, repetition rate), a tolerance range is defined which specifies the extent to which the position of the beam center or the angle of incidence is permitted to vary on account of a drift of the beam path, without operation resulting in damage or destruction of the photonic structure. What are striven for here are, for example, the discussed location ranges of the beam center and angle of incidence ranges—depending on fiber type—in the range of ±5% to ±10% of the mode field diameter and in the range of ±5% to ±10% of the beam divergence.

The embodiments proposed herein, with regard to the use of highly intensive laser pulses, allow the provision of larger tolerance ranges for the input coupling into hollow core fibers and thus more robust beam guiding systems for industrial use in view of possible damage or destruction of the photonic structure. By virtue of the peak pulse power that is reduced according to the invention in the case of input coupling into the hollow core fiber, the threshold for the destruction of the hollow core fiber, in particular of the photonic structure such as the core wall structure, by such laser pulses of reduced peak pulse power is raised. Since fiber destruction can thus be avoided or at least reduced in its frequency, failures of systems in which a hollow core fiber is used for transporting highly intensive pulsed laser radiation and components of such systems can be reduced.

Embodiments which allow aspects from the prior art to be improved at least in part are disclosed herein. In particular, further features and their expediencies will become apparent from the following description of embodiments with reference to the figures. In the figures:

Aspects described herein are based in part on insights which were gained concerning the tolerance range of beam path parameters in the case of hollow core fibers that are intended to be used for transporting laser radiation. In this regard, it has been recognized that a tolerance range in which beam drifts are allowed is significantly reduced, the higher the peak power of the coupled-in laser radiation to be transported.

FIG. 1A elucidates the use of a hollow core fiber 1 (transport fiber) for transporting high-power laser pulses 3A. The high-power laser pulses 3A are generated by a laser pulse source 3A and each have an initial pulse duration $\Delta t$. The high-power laser pulses 3A are focused onto a first fiber end 1A of the hollow core fiber 1 by a fiber input coupling device comprising a lens 5A. In particular, the beam profile of the high-power laser pulses 3A overlaps a hollow core 4A of the hollow core fiber 2, such that only a small intensity portion of the beam profile overlaps the material 4B of the hollow core fiber 1 surrounding the hollow core 4A. In the case of ideal input coupling (that is to say that there is a minimal overlap between the beam profile and the material), for fixed beam parameters a maximum intensity I_max represents a destruction threshold of the fiber type (see also FIG. 4).

If, for intensities below the maximum intensity I_max, the beam path parameters of the beam path of the incident laser radiation lie in a tolerance range, which is often very narrow on account of the high intensities, the laser radiation can be guided in the hollow core 4 as far as a second fiber end 1B. The high-power laser pulses emerge there as highly divergent laser radiation. In FIG. 1A, the emerging laser radiation is collimated by a further lens 5B and is guided for example as a free beam to a laser processing head 7 with a focusing lens 7A for the processing of a workpiece 9. FIG. 1A indicates that a processing pulse duration $\Delta t'$ of the high-power laser pulses 3A' emerging from the hollow core fiber 1 can (substantially) correspond to the initial pulse duration $\Delta t$ of the coupled-in laser pulses 3A. It is noted that a dispersive effect of the hollow core fiber 1 may be present, with the result that the pulse duration may change during the propagation of the laser pulses in the hollow core fiber 1 (fiber-based stretching or shortening of the pulse duration).

If the beam path parameters (beam center, angle of incidence) of the high-power laser pulses 3A lie outside the (narrow) tolerance range during the input coupling or if the peak intensities of the high-power laser pulses 3A are too high, beam intensities that lead to damage to the first fiber end 1A can arise in the region of the material 4B (for example in the region of a photonic structure). This clearly likewise applies to intensities equal to or above the maximal intensity $I\_max$. If the hollow core fiber 1 is damaged, this can have the effect that ultimately no laser radiation that is usable for processing of the workpiece 9 emerges from the hollow core fiber 1.

Figure 1B:
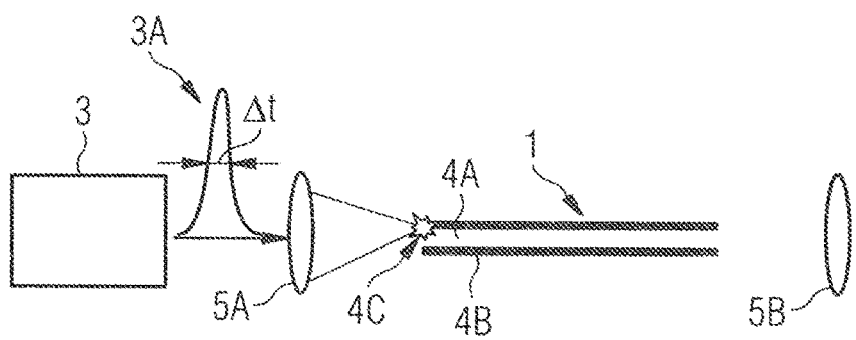
FIG. 1B shows a schematic illustration for elucidating an input coupling of pulsed laser radiation into a hollow core fiber for beam path parameters outside the tolerance range.

FIG. 1B elucidates as an example the case in which the lens 5A is misaligned in relation to the first fiber end 1A, such that the beam center of the beam profile of the high-power laser pulses 3A is not centered with the hollow core 4A and a core wall 4C of the hollow core fiber 1 is thus ablated or thermally deformed, for example, by the incident laser radiation.

A maximum destruction peak power, starting from which a photonic structure is destroyed since the maximum intensity $I\_max$ is reached and starting from which the hollow core fiber is no longer usable for reliable use for transporting high-power laser pulses for any possible input coupling situation (i.e. even in the case of ideal input coupling), is referred to as a destruction threshold. The destruction threshold and thus also the tolerance range considered herein in the case of input coupling increase with the pulse duration of the incident laser pulses since, for a destructive interaction between the laser radiation and the fiber material, it is necessary to apply all the more pulse energy, the longer the pulse duration.

The inventors have recognized, then, that for a laser system which is provided in the context of industrial manufacturing and which uses a hollow core fiber for transporting high-power laser pulses of a laser pulse source, it is necessary to provide a sufficiently large tolerance range (target tolerance range) during input coupling into the hollow core fiber. By way of example, the tolerance range comprises—depending on fiber type—changes/fluctuations of the beam center in the range of ±5% to ±10% of the mode field diameter and changes/fluctuations of the angle of incidence in the range of ±5% to ±10% of the beam divergence. In the target tolerance range, the intention is for fiber destruction generally not to be possible anymore in the case of the variations of the beam path parameters that are possible during operation (tolerable incorrect input couplings). The tolerance range is provided by a tolerance range threshold in the form of a (limit) intensity $I\_Lim$. The (limit) intensity $I\_Lim$ is so far below the maximum intensity $I\_max$, i.e. below the "ideal" destruction threshold, that the fluctuations that are possible during operation are covered within the target tolerance range. The lowered tolerance range threshold in relation to the destruction threshold serves to protect the hollow core fiber 1. The protection is intended to be ensured in particular even in the case of pulse energies (for example in the µJ range, i.e. greater than 1 µJ or greater than 10 µJ) which in principle (in the case of a compressed pulse duration) could lead to highly intensive laser pulses having peak intensities above the destruction threshold.

The inventors have recognized, then, that destruction of the hollow core fiber can be prevented despite high pulse energies (which in principle could lead to peak intensities above the destruction threshold) if, on account of a "long" transport pulse duration, the laser pulses to be transported always remain below the tolerance range threshold of the fiber type in terms of their effect (intensity). The inventors correspondingly propose increasing the tolerance range during input coupling at least as far as the target tolerance range by virtue of the fact that the tolerance range threshold with regard to the peak intensity/pulse energies is not exceeded as a result of a longer pulse duration than the minimum pulse duration obtainable for example as a result of the available bandwidth (for example as a result of a lengthening of the transport pulse duration before the input coupling or as a result of a non-complete compression of the laser pulse duration before the input coupling into the hollow core fiber).

That is to say, if beam path parameters are intended to be able to vary to a certain extent during input coupling, it is possible to provide a corresponding tolerance range of beam path parameters during input coupling by virtue of the pulse duration of the laser pulses being set/lengthened to a corresponding length with the aid of a pulse duration setting device (for example a pulse duration stretching device or a non-maximally compressing pulse duration compression device). In other words, the inventors propose effecting a stretching in the sense of a separate pulse duration lengthening or a non-maximally performed compression (setting) of the pulse duration before the input coupling into a hollow core transport fiber, in order to bring about a reduction of the peak (pulse) power. This is because if the pulse duration of the laser pulses is set to be long enough, it is possible to avoid or at least reduce damage to e.g. core wall webs within a tolerance range that is predefined with regard to the input coupling. If a limit of the tolerance range is reached (for example a violation of the maximum allowed deviation—in the target tolerance range—of the beam center from a central axis of the hollow core fiber—greater than e.g. ±5% or ±10% of the mode field diameter—or of the maximum allowed deviation—in the target tolerance range—of the angle of incidence from axial incidence—greater than e.g. ±5% or ±10% of the beam divergence), a realignment of the beam path can be carried out in order to reestablish the desired transport properties, without the transport fiber previously having been damaged and without possibly even fiber exchange having been necessitated.

The concept of the stretching of the pulse duration before input coupling as proposed herein may also be referred to as "chirped pulse transport". The stretching of the pulse duration makes it possible to transport laser pulses which already have a complete pulse energy required for the laser processing, but have been reduced in terms of their peak (pulse) power for transport. The stretching (separate pulse duration lengthening or non-maximally performed compression) to the transport pulse duration is effected to an extent that ensures that the hollow core fiber is not destroyed in the case of misalignment in a tolerance range required for the beam guiding (usually in the target tolerance range predefined for the fiber application).

FIGS. 2A to 4 elucidate the procedure according to the embodiments of the present invention.

Figure 2A:
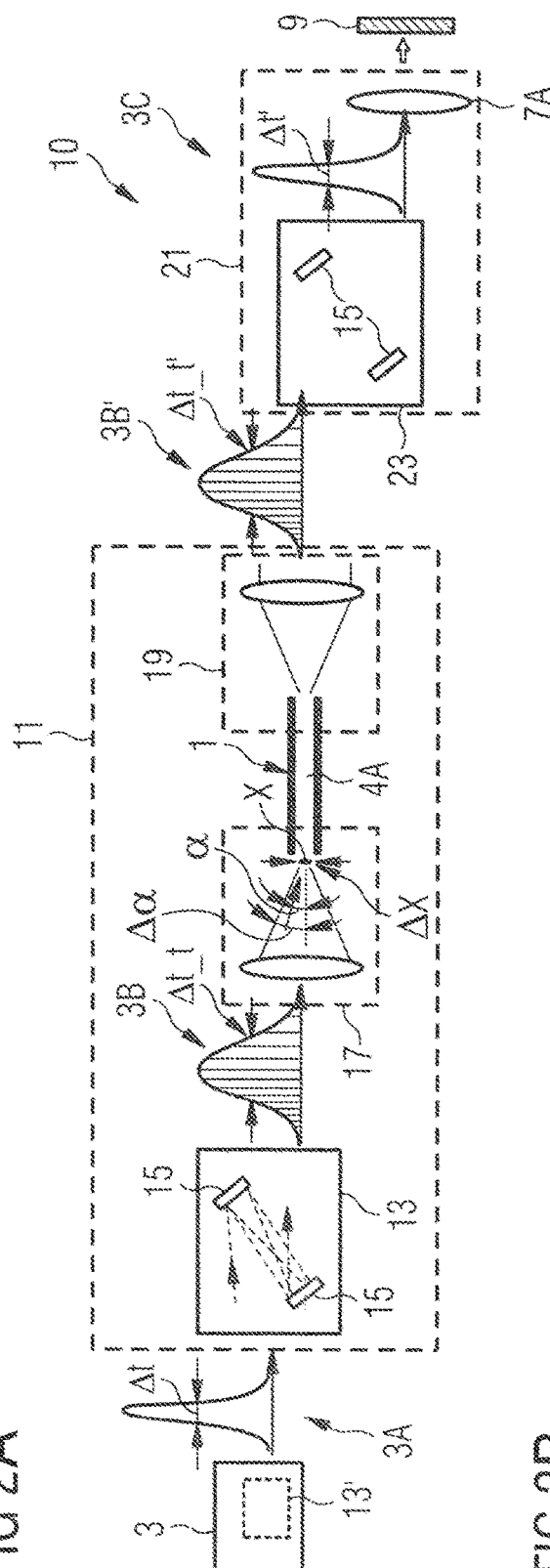
FIG. 2A and FIG. 2B show schematic diagrams for elucidating the use of a device for transporting pulsed laser radiation with a pulse duration setting device in the case of laser-based material processing.

FIG. 2A shows a system 10 for the laser-based processing of a material 9. The system 10 has a laser pulse source 3, a device 11 for transporting pulsed laser radiation, and a laser processing head 21.

The laser pulse source 3 outputs pulsed laser radiation in the form of laser pulses 3A with an initial pulse duration $\Delta t$. The pulsed laser radiation is fed to the device 11, which, by way of a hollow core fiber 1, enables flexible transport of the pulsed laser radiation to the location at which the material processing is intended to be carried out.

The device 11 for transporting pulsed laser radiation comprises the hollow core fiber 1, a pulse duration setting device 13 and a fiber input coupling device 17 and also optionally a fiber output coupling device 19.

If the hollow core fiber 1 is designed as a pure transport fiber, it accordingly does not affect the transported laser radiation. By way of example, it is possible to avoid a self-phase modulation, a spectral broadening or a spectral shift during transport in the hollow core fiber 1 used as a pure transport fiber. In some embodiments, the transport can be accompanied by a spectral broadening in the fiber in a targeted manner by virtue of the hollow core being filled with a gas; such a transport fiber can be part of a device described herein for transporting pulsed laser radiation, provided that the filling with gas does not lead to optical conditions under which the fiber is damaged during the input coupling, and provided that the spectral broadening does not lead to damage to the fiber during transport. Furthermore, the fiber can have a dispersive effect on the pulsed laser radiation.

Figure 3A:
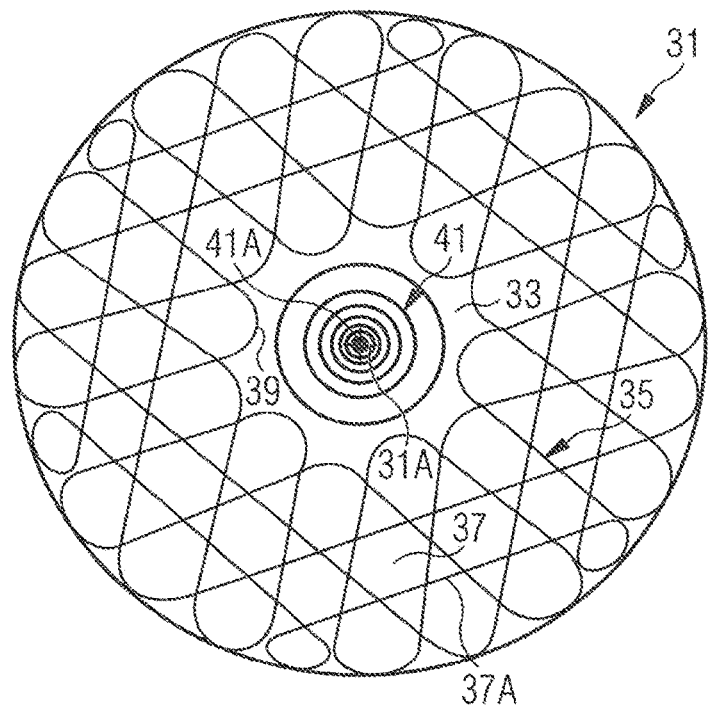
FIG. 3A and FIG. 3B show plan views of an input coupling end of an exemplary hollow core fiber for explaining a variation of a beam path parameter.

By way of example for a hollow core fiber, FIG. 3A schematically shows a plan view of one fiber end of a Kagome fiber 31 (as an example of a microstructured optical fiber, also referred to as a photonic crystal fiber). The fiber end shown provides the fiber end face through which laser radiation is intended to be coupled into the Kagome fiber 31.

The light guiding region of the Kagome fiber 31 is evident in the center, said light guiding region being provided as a central hollow core 33 by the Kagome fiber 31. The hollow core 33 has a substantially round orifice opening surrounded by a perforated cladding structure 35. The perforated cladding structure 35 consists of channels 37 which surround the hollow core 33 and effect optical guiding of the light in the hollow core 33. In this "photonic" structure, the channels 37 are formed by a specific arrangement of wall webs 37A.

The photonic structure delimits the hollow core 33 by the furthest inwardly situated wall portions 39. The wall portions 39 shown in FIG. 3A form a core wall.

The aim of transporting laser radiation with a Kagome fiber 31 is to guide laser radiation with the least possible losses and with the lowest possible susceptibility with regard to disturbances of the transport conditions. An exemplary rotationally symmetrical intensity distribution 41 (beam profile) of an incident laser beam is indicated schematically in FIG. 3A. In the situation illustrated, the beam center 41A (given by the maximum intensity in the center of the intensity distribution) associated with the laser beam ideally coincides with a central axis 31A of the Kagome fiber 31, such that in the Kagome fiber 31, too, the beam profile of the laser radiation can propagate centrally in the hollow core 33.

Referring to FIG. 2A again, the pulse duration stretching device 13 is illustrated by way of example as a grating stretcher comprising two gratings 15. The dispersive splitting and combining of the wavelengths forming the laser pulses is indicated schematically.

Generally, the pulse duration stretching device 13 comprises at least one optical element such as a diffraction grating, a volume Bragg grating, a prism and/or a grating prism (grism). As shown by way of example in FIG. 2A, two optical elements can be arranged in the beam path in order to effect a lengthening of the pulse duration of the laser pulses 3A. Further optical elements such as folding mirrors, focusing mirrors or lenses can be provided for constructing a pulse duration adapting device with a settable dispersion contribution (such as the pulse duration stretching device 13 in FIG. 2A or the pulse duration compression device 13" in FIG. 2B). A further exemplary pulse duration adapting device, in particular a compressor for fine setting of the pulse duration, is disclosed in DE 10 2016 110 947 A1, filed by the present applicant. Such a compressor can be used for example for a non-complete compression of laser pulses (see set-up in FIG. 2B).

FIG. 2A shows laser pulses 3B which have a frequency chirp and emerge from the pulse duration stretching device 13 in a correspondingly temporally lengthened manner with a transport pulse duration $\Delta t\_t$. The transport pulse duration $\Delta t\_t$ is thus significantly longer than the theoretical lower limit for the compression of the laser pulses of the laser pulse source 3, said limit being determined by the time-bandwidth product. The lengthened laser pulses 3B are fed to the fiber input coupling device 17.

The fiber input coupling device 17 comprises an (input coupling) lens 5, for example. The lens 5 is arranged in such a way that it focuses the laser pulses at an angle $\alpha$ of incidence onto the fiber end face of the hollow core fiber 1 with a beam center position X in the region of the orifice opening of the hollow core 4A.

FIG. 2A schematically elucidates a range $\Delta\alpha$ for the angle $\alpha$ of incidence and a range $\Delta X$ for the position X of the beam center. The ranges $\Delta\alpha$ and $\Delta X$ define the tolerance range for the values of the beam path parameters "angle $\alpha$ of incidence" and "beam center position X". They are e.g. a few percent (for example in the range of ±1%, ±2%, ±5% or ±10%) of the mode field diameter and of the beam divergence, e.g. in the range of ±5% to ±10% of the mode field diameter and in the range of ±5% to ±10% of the beam divergence.

Figure 3B:
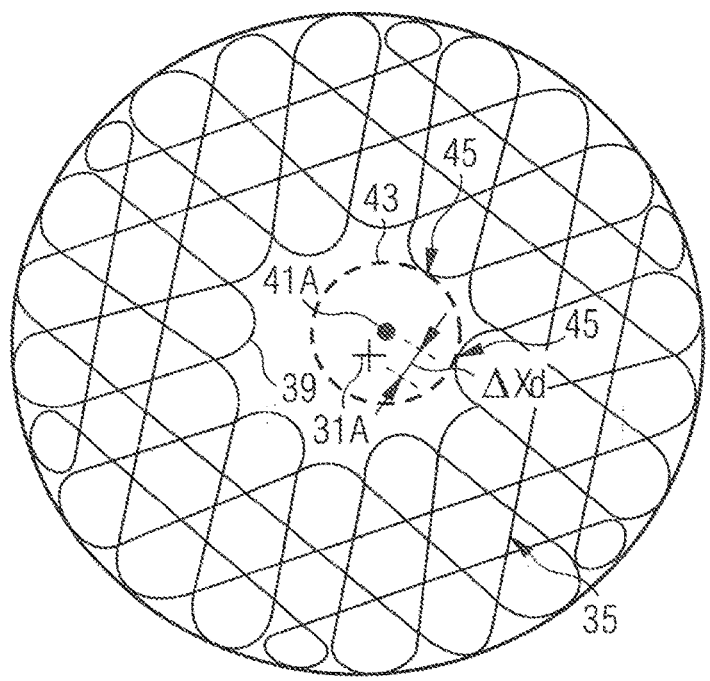

In this respect, FIG. 3B elucidates a position of the beam center 41A, which impinges on the fiber end in a manner displaced by an offset $\Delta Xd$ in relation to the central axis 31A of the Kagome fiber 31. The figure indicates in a dashed manner an interaction region 43 that does not yet significantly overlap the photonic structure 35 (minimal overlap regions 45 with the core wall), such that as yet no damage to the hollow core fiber is caused in the case of the offset $\Delta Xd$. It is evident that, in the case of the offset being enlarged beyond the offset $\Delta Xd$, the interaction region 43 would overlap the photonic structure 35. That is to say that the offset $\Delta Xd$ delimits the tolerance range with regard to the beam path parameter "beam center position". In a similar manner, a variation of the angle $\alpha$ of incidence beyond the tolerance range with regard to the beam path parameter "angle of incidence" can cause an interaction between the laser pulses and the material of the hollow core fiber 1.

The lengthening of the pulse duration with the aid of the pulse duration stretching device 13 in the exemplary embodiment in FIG. 2A (or, with regard to FIG. 2B, the non-complete compression with the aid of the incomplete compression in a compressor 13") is set according to embodiments of the present invention in such a way that damage to the hollow core fiber cannot occur over a tolerance range of the beam path parameters such as is required for the respective use of a hollow core fiber.

Referring to FIG. 2A again, the fiber output coupling device 19 is illustrated at the output of the hollow core fiber 1, and collimates laser radiation emerging divergently from the hollow core fiber by means of a lens 5B, for example. Since the hollow core fiber 1 is designed as a transport fiber, the emerging laser pulses 3B' at the fiber end have a pulse duration $\Delta t\_t'$ that substantially corresponds to the transport pulse duration $\Delta t\_t$. This is the case as long as an interaction between the laser radiation and the fiber (for example with regard to nonlinear effects for pulse duration shortening/spectral broadening) does not take place at the transport fiber.

In order to generate a desired peak (pulse) power with highly intensive laser pulses after beam transport, the laser pulses 3B' that have emerged can be temporally compressed downstream of the hollow core fiber by means of corresponding dispersion compensation in a pulse duration adapting device, for example with a grating or prism compressor. For example, a grating compressor at the fiber output can be set in such a way that a desired processing pulse duration and thus the peak power required for the laser processing are available after the beam transport at a target location, e.g. in a material to be processed of a workpiece 9.

As shown in FIG. 2A, for this purpose the laser processing head 21 can be configured as a compression laser processing head. That is to say that the laser processing head 21 comprises, in addition to the focusing lens 7A, a pulse duration adapting device 23 illustrated by way of example as a grating compressor. The pulse duration adapting device 23 is set in such a way that the laser pulses 3B' fed to it are output as compressed laser pulses 3C with a processing pulse duration $\Delta t'$. The processing pulse duration $\Delta t'$ corresponds e.g. approximately to the initial pulse duration $\alpha t$ of the laser pulses 3A. Generally, the pulse duration adapting device 23 is embodied in a settable manner such that the processing pulse durations of the laser pulses 3C provided for the laser processing can be achieved for the provided range of transport pulse durations.

Furthermore, the compressed laser pulses 3C have a pulse energy which—apart from losses in the pulse duration stretching device 13, the pulse duration adapting device 23, the hollow core fiber 1 and the input and output coupling devices 17, 19—corresponds to the pulse energy of the laser pulses 3A of the laser pulse source 3.

The laser processing of the workpiece 9 can then be performed with the compressed laser pulses 3C.

On account of the transport pulse duration set, during operation a variation of the beam path parameters (beam center position and direction of incidence) can occur within the scope of the target tolerance range without the transport fiber being jeopardized. It is only if the limits of the target tolerance range are reached or exceeded that a renewed alignment/realignment (and/or, under certain circumstances, a greater pulse duration lengthening) becomes necessary. The realignment can be performed manually or in an automated manner.

In destruction threshold experiments, it was ascertained that. in the case of a fiber geometry examined by way of example, a reliable transport of laser pulses with a peak power of greater than 2 GW was no longer possible. A robust transport of the same laser pulses was able to be ensured, however, if the laser pulses were temporally stretched for the input coupling into the fiber (and were correspondingly compressed again downstream of the fiber). For example, high-power laser pulses with pulse energies in the range of 100 µJ or more and a pulse duration of a few hundred femtoseconds led to peak pulse powers which, in the case of sufficient overlap with a material of the fiber, led to damage to the structure of the material. A pulse duration lengthening (generally the use of a longer pulse duration) allowed damage to the structure of the fiber to be prevented and transport thus to be made possible. The embodiments disclosed herein can be used advantageously in particular if, for non-stretched pulses (pulse durations in the range of the maximum temporary compressibility of the laser pulses), peak pulse powers of 25 MW or more (pulse parameters of e.g. approximately 10 µJ or more in the range of a (few) hundred femtoseconds, e.g. 300 fs) are to be transported by a hollow core fiber.

In order to be able to define the required length of the pulse duration (lengthening of the pulse duration/non-complete compression), i.e. the transport pulse duration, it is possible to carry out a determination of the destruction threshold for the respective hollow core fiber design (e.g. photonic bandgap, inhibited coupling, antiresonant, negative curvature hollow core fibers) as follows:

1. Laser pulses of a laser pulse source are coupled into the fiber with ideal and stable beam parameters (in particular with regard to mode field diameter, aperture angle, $M^2$ value, stability with regard to position and angle).
2. By means of the peak power being increased step by step, an upper limit of the power—the maximum peak pulse power—is determined at which the hollow core fiber design is still able to guide the laser pulses without being destroyed.
3. With the use of a laser pulse source with fluctuating beam parameters (e.g. fluctuations of $M^2$ values, position and angle stability, pulse stability), the value of the maximum peak pulse power can additionally be reduced in order to ensure transport free of destruction. The peak pulse power thus reduced corresponds to the (limit) intensity I_Lim determined for the target tolerance range and lying below the maximum possible peak pulse intensity I_max.
4. The reduction of the peak power is achieved by means of a stretching factor of the laser pulses in relation to the minimum possible pulse duration (temporary lengthening of the pulse duration for lowering the peak power with an pulse duration stretching device or by means of non-maximally performed compression with a pulse duration compression device in the laser pulse source).
5. In addition, a safety factor can also be taken into account in the case of the stretching factor in order to realize robust and reliable fiber guiding. The peak power is additionally reduced on account of the safety factor for example by at least a factor of 2, preferably a factor of 10, and particularly preferably a factor of 100, such that the maximum peak pulse power present at the fiber end is lower than the peak pulse power determined for the target tolerance range by this factor (safety factor).

Figure 4:
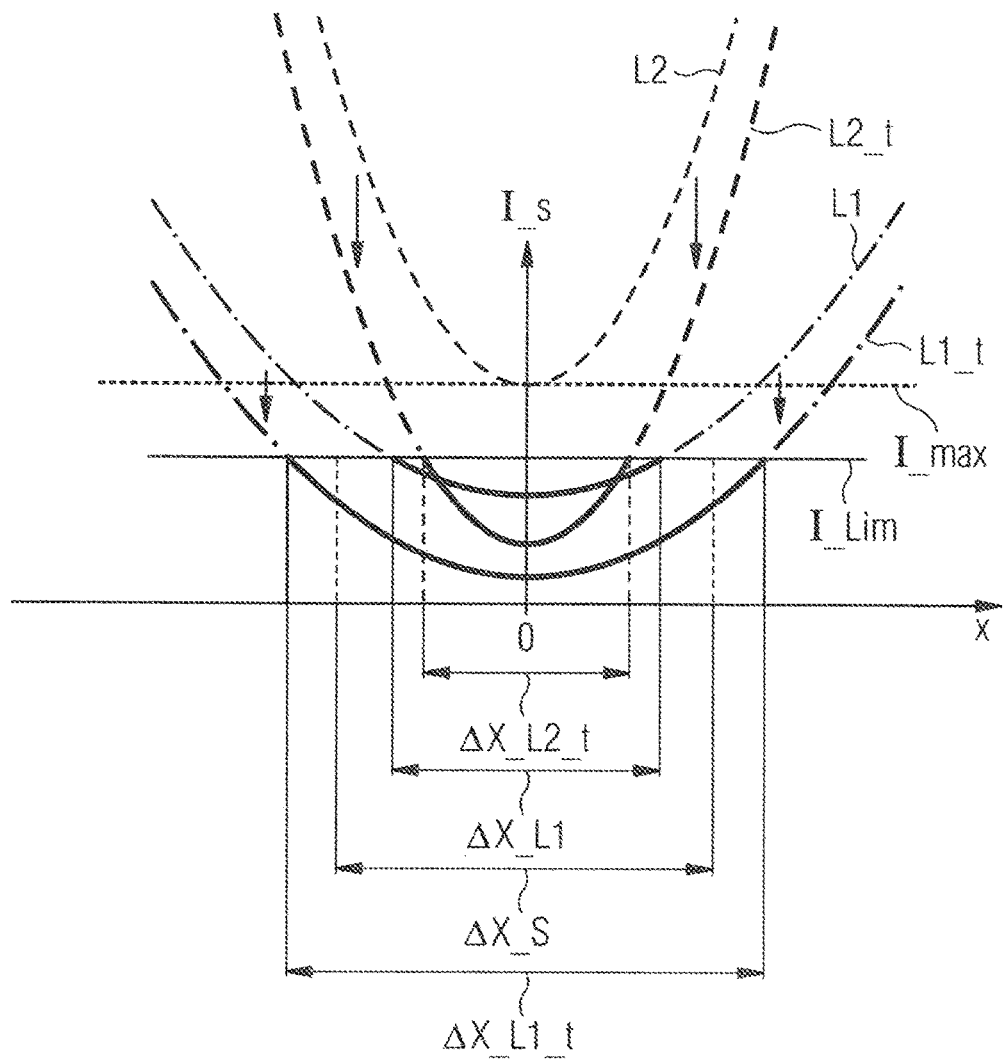
FIG. 4 shows a diagram for elucidating the settability of the beam intensity present during the input coupling with use of a pulse duration setting device.

FIG. 4 shows a diagram for elucidating the settability of the beam intensity for two initial situations (e.g. for laser pulses from two different laser beam sources). In the diagram, the intensity in the structure region ((I_s-axis) such as is introduced in a part of a hollow core fiber that is critical with regard to damage is plotted as a function of the beam center position (x-axis). In the case of the Kagome fiber 31 shown in FIG. 3A, the critical part would be given for example by the thin wall webs 37A composed of glass, generally by the photonic structure realized.

Furthermore, a destruction threshold intensity I_max is depicted in the diagram in FIG. 4. Said destruction threshold intensity is specific to the hollow core fiber respectively considered. If the intensity I_s in the case of an optimum beam center position lies below the threshold intensity I_max, it is possible for pulsed laser radiation to be transported without damage to the hollow core fiber. If the intensity I_s is greater than or equal to the destruction threshold intensity I_max, the hollow core fiber is damaged even in the case of ideal alignment. It is noted that the intensity of the laser radiation in the hollow core fiber results as power per area from the peak pulse power and the mode field area of the hollow core fiber since, for a hollow core fiber considered, the mode field area is predefined and does not change. It is furthermore noted that the mode field area generally differs in magnitude from hollow core fiber to hollow core fiber and in particular for different fiber types.

Furthermore, a tolerance range threshold intensity I_Lim (threshold intensity for short) is depicted in the diagram in FIG. 4. This threshold intensity is defined in a manner specific to the hollow core fiber respectively considered within the scope of operation striven for. If the intensity I_s in the case of a beam center position lies below the tolerance range threshold intensity I_Lim, it is possible for pulsed laser radiation to be transported without damage to the hollow core fiber. If the intensity I_s lies above the tolerance range threshold intensity I_Lim, there is the risk of damage to the hollow core fiber and input coupling into the hollow core fiber should be avoided.

In FIG. 4, tolerance ranges resulting from the plotted intensity profiles and the threshold intensity I_Lim are depicted for the beam path parameter "beam center". If a tolerance range satisfies the required extent that is to be provided for the operation of the associated laser system, the transport pulse duration has been adapted sufficiently.

In general terms, the x-axis describes a deviation from optimum input coupling conditions which may arise e.g. as a result of a change in the mode field diameter at the fiber input or as a result of the position of the beam center drifting (offset ΔXd in FIG. 3B) away from the central axis and/or as a result of a reduction of the angle of incidence of the laser radiation to be transported. Such drifting may be caused for example by temperature fluctuations of optical elements. What is plotted on the y-axis is the intensity/peak power which interacts with the critical part of the fiber and which, if it lies above the threshold intensity I_Lim, can lead to the destruction of the fiber and which, if it lies above the destruction threshold intensity I_max, leads to the destruction of the fiber.

The first example (line L1) shows the profile of the intensity for coupled-in laser pulses whose pulse duration was not specifically set for the transport fiber. The associated tolerance range ΔX_L1 may not enable robust operation in every application of a system which uses the transport device. By adapting the pulse duration (lengthening the pulse duration to a transport pulse duration), it is possible to lower the peak power. The line L1_t runs below the line L1 in the diagram; that is to say that the peak intensities were reduced and the tolerance range ΔX_L1_t was increased, said tolerance range being provided for the laser pulses which lead to intensities in the critical region which are less than the tolerance range threshold intensity I_Lim.

If, in the first example, a target tolerance range ΔX_S required for operation lies between the tolerance range ΔX_L1 and the tolerance range ΔX_L1_t, the use of the hollow core fiber for transporting pulsed laser radiation can be made possible by the lengthening of the pulse duration.

The second example is based on an intensity distribution on the transport fiber which does not allow input coupling. Line L2, on account of an e.g. very high pulse energy, runs continuously above the destruction threshold intensity I_max and thus also continuously above the tolerance range threshold intensity I_Lim as well; that is to say that the fiber would be damaged even in the case of an ideal alignment (X=0). It is only by means of the peak power being reduced according to embodiments of the present invention by means of stretching of the pulse duration that at least one part of a line L2_t runs below the tolerance range threshold intensity I_Lim. The reduction of the interacting intensity/power according to embodiments of the present invention thus makes it possible to realize the transport of the laser pulses with the high energy in a tolerance range ΔX_L2_t. In this way, it is possible to define a target tolerance range which is adapted to this example and which for example corresponds to the tolerance range ΔX_L2_t or is somewhat smaller, in order to take account of further uncertainties in the beam parameters.

The pulse duration adapting devices (pulse duration stretching devices 13 and compressor system 23) can generally use optical elements used in transmission or in reflection, such as diffraction gratings, volume Bragg gratings, prisms and/or grisms and/or dispersive mirrors such as Gires-Tournois interferometer mirrors (GTI mirrors). Grating structure and grating compressor combinations coordinated with one another allow the introduction and compensation of large dispersion values. Large dispersion values with correspondingly large stretching can become necessary in the case of laser pulses with high power/high pulse energy such as can be generated for example with a generative amplifier system as a laser pulse source.

It is mentioned supplementarily with regard to FIG. 2A that the pulse duration setting device of the device 11 can also be provided in the laser pulse source 3. FIG. 2A schematically indicates a device 13' which can be configured as a pulse duration stretching device, by which the pulse duration on the one hand can be actively lengthened, or as a pulse duration compression device, which non-maximally compresses the laser pulses. The pulse duration compression device is accordingly set such that a dispersion of the laser pulses of the pulsed laser radiation remains, with the result that the laser pulses are compressed in terms of the pulse duration "only" to the transport pulse duration.

Figure 2B:
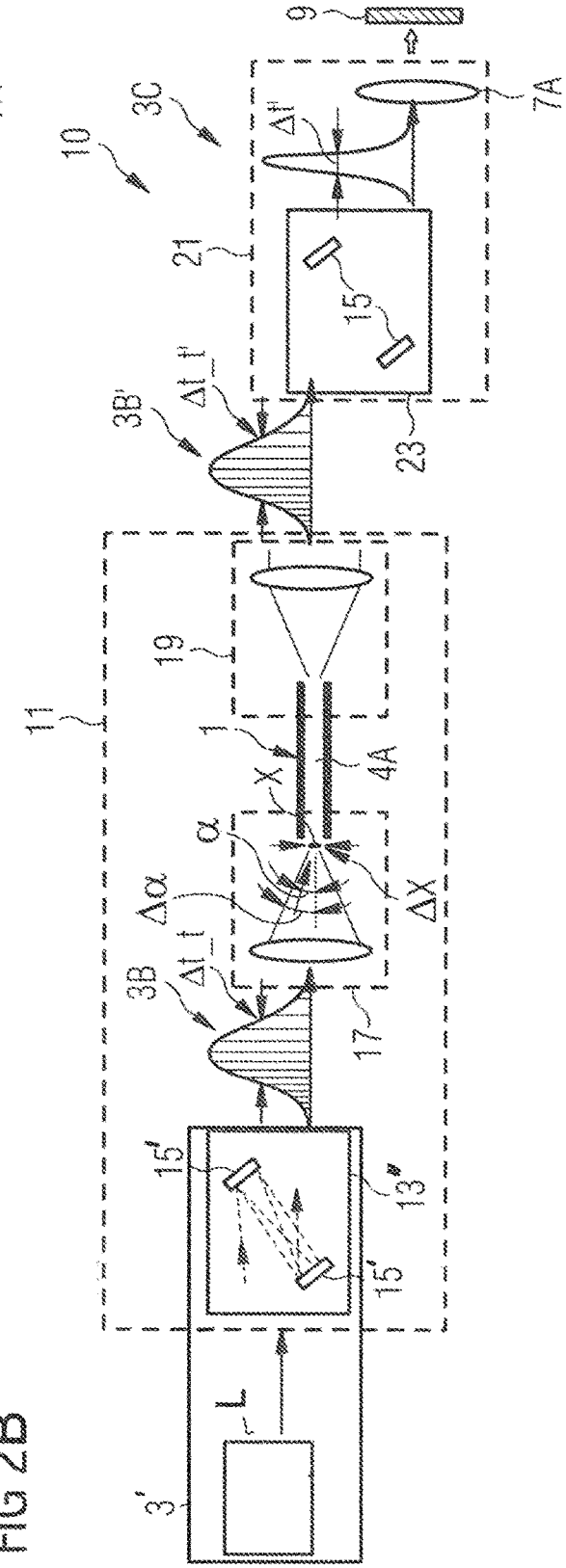

FIG. 2B elucidates the set-up in which a pulse duration compression device 13" (also referred to herein as compressor for short) of a laser pulse source 3 is used for the pulse compression of amplified laser pulses. FIG. 2B shows that the laser pulse source 3' generates laser pulses for transport by the device 11 in an amplifier system L. The amplified laser pulses are output by the laser amplifier system L with a pulse duration which is significantly longer than a minimum possible pulse duration in relation to a spectral bandwidth present after amplification. The amplifier laser pulses are temporally compressed to the transport pulse duration Δt_t by means of at least one optical element 15'. The amplified laser pulses are thus output as laser pulses 3B stretched temporally in relation to the minimum possible pulse duration and are fed to the transport fiber 1 directly (i.e. without passing through the stretcher 13).

With regard to the device 11 and the exemplary further beam guiding of the laser pulses 3B' output by the device 11, reference is made to the above description of FIG. 2A.

In accordance with the set-up in FIG. 2B, for the use of the device 11, the pulses 3B are output by the laser pulse source 3' in such a way that their pulse duration was compressed by the pulse duration compression device 13" to an extent that was not the dispersively maximum possible extent on the basis of the given time-bandwidth product. The time-bandwidth product theoretically determines the lower limit for the compression of the laser pulses, i.e. the pulse duration thereof for a given spectral bandwidth, wherein the pulse duration is usually given by the full width at half maximum (FWHM) of the intensity profile of the laser pulses. The time-bandwidth product of ultra-short laser pulses really generated usually does not reach the theoretical limit value on account of pulse shape, non-removable residual dispersion (remaining chirp), etc.

Generally, for a given pulse energy (here pulse energies in the μJ range, e.g. greater than 10 μJ, such as 100 μJ or more), the time-bandwidth product also determines the theoretically attainable peak pulse power, wherein once again on account of pulse shape, non-removable residual dispersion, etc., the theoretically attainable peak pulse power cannot be attained by real laser pulses.

In accordance with the set-up in FIG. 2B, after the compression in the compressor 13' a residual dispersion remains in the beam, i.e. the pulse duration of the laser pulses 3B that are output lies above the lower limit for the pulse duration and the peak pulse power present is lower than the theoretically attainable peak pulse power.

In relation to the time-bandwidth product, the target pulse duration can then be set in such a way that the peak pulse power present at the hollow core optical fiber corresponds to the (limit) intensity I_Lim or still lies below the latter in accordance with the safety factor, such that the operation of the hollow core optical fiber as transport means can be ensured in the target tolerance range.

In comparison with the active pulse duration lengthening in the stretcher 13 in FIG. 2A, the controlled setting of the compressor 13" in FIG. 2B, in the sense of a non-optimized dispersion-compensating setting (also referred to herein as "misalignment" or "out of alignment"), has the advantage of a simpler set-up with fewer optical components and correspondingly reduced costs. Fewer optical components can furthermore avoid intensity losses during beam guiding such as can occur in particular in the stretcher 13. Fewer optical components can furthermore improve the beam pointing/accuracy in the beam path.

The setting of the compressor 13' is such that a residual dispersion remains in the laser beam, that is to say that the laser pulses are not completely compressed to the shortest pulse duration possible with the given spectral bandwidth. In other words, a misalignment of the compressor 13' is performed in such a way that the target pulse duration lying above the lower limit of the pulse duration given by the time-bandwidth product is attained dispersively (by means of the residual dispersion), such that a peak pulse power of the coupled-in pulses—given inclusion of a safety factor—is for example at most 50%, 10% or even at most 1% of a permissible peak pulse power determined for the tolerance range. By way of example, 200 fs laser pulses (i.e. time-bandwidth-product-limited FWHM pulse duration in the range of 200 fs) with pulse durations of greater than 1 ps (FWHM pulse duration) can be output by the laser pulse source 3' and be coupled into the hollow core fiber 1.

The embodiments disclosed herein can be implemented in a set-up in accordance with FIG. 2B by means of non-complete compression as follows. Firstly, the destruction threshold of the hollow core fiber is determined or it is already available, the determination being carried out in the entire tolerance range. Then, usually in the factory the compressor 13" is set in relation to the transport fiber used. The setting is effected e.g. by adaptation of the spacing of the gratings 15' in the dispersion-compensating grating arrangement of the compressor 13" (or the dispersion-adding grating arrangement of the stretcher 13 in the case of FIG. 2A) or by the setting of the orientation of a glass lamina in the compressor 13" (or stretcher 13), in the case of a set-up in accordance with DE 10 2016 110 947 A1, already cited. However, laser processing to be performed using the laser beam requires laser pulses compressed as completely as possible (pulse duration as close as possible to the pulse duration given by the time-bandwidth product). This compression can be effected in the downstream compressor 23 and/or at least partly in the hollow core fiber.

It is noted that laser pulse sources can be configured extremely stably in particular with regard to pulse energy and spectral width, such that, with regard to defining the tolerance range, changes in the geometric parameters of the beam path, that is to say the beam path parameters "beam center position" and "angle of incidence" as discussed in the introduction, are primarily of importance.

Besides these beam pointing parameters, the tolerance range is generally dependent on a mode field diameter and a single-modeness of the respective hollow core fiber. The greater the single-modeness of the respective fiber type, the smaller the tolerance range, since an overlap between the incident transverse beam profile and a material of the respective fiber type can be all the greater. The greater the mode field diameter of the fiber, the greater the tolerance range, since less material overlap is present.

In accordance with a customary tolerance range for transport optical fibers, the beam path parameters are intended to lie in a predefined location range of the beam center and in a predefined range of the angle of incidence. As already mentioned, depending on fiber type, a variation to be tolerated in the position of the beam center can lie in a location range of ±5% to ±10% of the mode field diameter (for example in the range of ±5 μm from a center axis of the hollow core fiber). Alternatively or additionally—once again depending on fiber type—a deviation to be tolerated in the angle of incidence can lie in the range of ±5% to ±10% of the beam divergence (for example a deviation in the range of 2 to 5 mrad).

In order then to be able to provide the tolerance range predefined in each case for an application of the transport fiber, what intensity can be "afforded" on the innermost (glass) webs without damage occurring is determined as a starting point in the implementation of the embodiments of the present invention. The peak pulse power to be implemented for the tolerance range is then to be set to a value below the resultant destruction threshold by a corresponding pulse duration being set by means of residual dispersion/additional dispersion.

The procedure in the implementation of the embodiments of the present invention can comprise the following steps, for example:

1. Determining a destruction threshold for a fiber, which involves determining in particular that level of residual dispersion/additional dispersion which gives rise to a peak pulse power which no longer leads to damage to the fiber in the tolerance range of the beam guiding parameters in the case of a given pulse energy and a given wavelength.
2. Setting the pulse duration in such a way that a peak pulse power is lower than the peak pulse power determined under 1. by at least a safety factor of 2, in particular by at least a safety factor of 10 or 100. Said safety factor can ensure safe operation, even in the case of fluctuations in the pulse energy or in the spectrum.

The embodiments disclosed herein are applicable in particular in the case of non-stretched (i.e. maximally attainable) peak pulse powers of at least 25 MW or more. Such peak pulse powers can e.g. already be attained with ultrashort pulses with pulse energies of approximately 10 μJ in conjunction with a pulse duration of 300 fs.

The embodiments for transporting high-power laser pulses with a hollow core fiber is based, in summary, on the following points:

1. With regard to the intensities/powers present, there is a (theoretical) destruction threshold at which the fiber is destroyed even in the case of perfect input coupling. The maximum peak pulse power which can be transported in a hollow core fiber is determined by the overlap present between the beam profile and the fiber structure. This applies to a perfectly aligned input coupling into the fiber and is manifested to an even greater extent in the case of misalignments. The maximum peak power that is able to be transported/coupled in is finite as a result.
2. There is a tolerance range for the input coupling of laser radiation into a hollow core fiber. Said tolerance range is dependent on the peak pulse power, but must have a certain size for reliable operation (target tolerance range).
3. During operation, input coupling must always remain below a maximum peak power (given by the tolerance range threshold intensity) which is assigned to the fiber. During the transport of laser pulses which could lead to higher peak pulse powers, a defined stretching factor is implemented (whether by means of the stretcher 13 or the misalignment of the compressor 13") for the pulse duration during the input coupling.

In summary, the systems disclosed herein differ from known transport systems in that the tolerance range for the input coupling of laser radiation into a hollow fiber is increased by virtue of the laser pulses experiencing a certain stretching factor by means of supplied additional dispersion (stretcher 13) or absent/incomplete dispersion compensation (misalignment of the compressor 13") before the input coupling. In this case, the stretching factor, i.e. the additionally provided dispersion or the absent dispersion compensation, is dependent on the transport fiber and the peak pulse power. By way of example, an initial pulse duration $\Delta t$ in the range of 50 fs to 1 ps can be lengthened to the transport pulse duration $\Delta t\_t$ by a factor (stretching factor) of at least 1.5; exemplary factors lie in the range of 1.5 to a few 100; by way of example, the factors are greater than or equal to a factor of 2, 10, or 100 and can take account of a safety factor. Preferably, the factors (i.e. the residual dispersion or the supplied dispersion) are kept as small as possible (e.g. a factor of less than 100) in order not to have to perform dispersion corrections unnecessarily.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Hollow core fiber
1A, 1B Fiber end
3 Laser pulse source
3A Laser pulse
3B, 3B' Stretched laser pulse
3C Compressed laser pulse
5A, 5B Lenses
7 Laser processing head
9 Workpiece
10 System
11 Transport device
13 Pulse duration stretching device
13' Device
13" Compressor
15 Dispersive element
17 Fiber input coupling device
19 Fiber output coupling device
21 Laser processing head
23 Pulse duration adapting device (compressor unit)
31 Kagome fiber
31A Central axis
33 Hollow core
33A Hollow core center
35 Perforated cladding structure/photonic structure
37 Channels
37A Wall webs
39 Wall portions of the core wall
41 Intensity distribution
41A Beam center
43 Interaction region
45 Overlap regions
$\Delta t$ Initial pulse duration
$\Delta t\_t$, $\Delta t\_t'$ Transport pulse duration
$\Delta t'$ Processing pulse duration
$\Delta x$ Beam center range
$\alpha$ Beam path parameter "direction of incidence"
$\Delta \alpha$ Angle of incidence range
$\Delta x\_d$ Drift distance
$I\_s$ Intensity in the structure region
$I\_lim$ (Maximum) limit intensity
L1, L2 Short pulse Is profiles
L1_t, L2_t Transport pulse Is profile
X Beam center
$\Delta X\_1$, $\Delta X\_1c$, $\Delta X\_2c$ Tolerance range
$\Delta X\_S$ Target tolerance range
$\Delta Xd$ Offset

The invention claimed is:

1. A device for transporting pulsed laser radiation-, the device comprising:
 a pulse duration setting device configured for receiving the pulsed laser radiation and for setting a transport pulse duration -of laser pulses of the pulsed laser radiation,
 a hollow core optical fiber having a hollow core surrounded by a material, wherein:
  the hollow core optical fiber is configured to transport the laser pulses that are coupled in at a first fiber end in the hollow core to a second fiber end and outputs the laser pulses from the second fiber end, and the hollow core optical fiber is configured to be operated with beam path parameter values that are present at the first fiber end and lie in a target tolerance range, and a fiber input coupling device configured to receive the pulsed laser radiation set to the transport pulse duration and to couple the pulsed laser radiation into the hollow core optical fiber with the beam path parameter values that lie in the target tolerance range, wherein the pulse duration setting device is configured to lengthen the laser pulses of the pulsed laser radiation from an initial pulse duration by a stretching factor to the transport pulse duration by using at least one optical element and to output the laser pulses as temporally stretched laser pulses, or to compress the laser pulses of the pulsed laser radiation that are output by a laser amplifier system with the initial pulse duration that is longer than a minimum pulse duration to the transport pulse duration by using the at least one optical element, wherein the transport pulse duration is set so that input coupling of the pulsed laser radiation into the hollow core is provided for all of the beam path parameter values -in the target tolerance range.

2. The device as claimed in claim 1, wherein
the target tolerance range is provided by fluctuations of beam parameters of the pulsed laser radiation that are to be tolerated during operation, wherein the beam path parameters comprise a beam center position and an angle of incidence,
the hollow core optical fiber in the target tolerance range is able to be assigned a maximum peak pulse power, above which an input coupling without damage to the hollow core optical fiber is not provided over the target tolerance range, and
the transport pulse duration of the pulsed laser radiation is set at the first fiber end so that a peak power of the pulsed laser radiation at the first fiber end is less than or equal to the maximum peak pulse power.

3. The device as claimed in claim 2, wherein a fluctuation to be tolerated in the beam center position is a first percentage of the mode field diameter, the first percentage is in a range of ±1%, ±2%, ±5% or ±10% of the mode field diameter, and a fluctuation to be tolerated in the angle of incidence is a second percentage of the beam divergence, the second percentage is in a range of ±1%, ±2%, ±5% or ±10% of the beam divergence.

4. The device as claimed in claim 1, wherein
the hollow core optical fiber comprises structural elements that form an inner core wall surrounding the hollow core, and
the pulse duration setting device and the fiber input coupling device are configured so that a spatial overlap of an intensity distribution of the pulsed laser radiation with the structural elements with the beam path parameter values within the target tolerance range is such that an intensity present in a region of the structural elements lies below a destruction threshold intensity of the inner core wall.

5. The device as claimed in claim 1, wherein the pulse duration setting device is configured to lengthen the initial pulse duration in the range of 50 fs to 1 ps with the stretching factor of at least 1.5 to the transport pulse duration.

6. The device as claimed in claim 1, wherein
the transport pulse duration is set by the pulse duration setting device so that, with regard to the material of the hollow core optical fiber, a damage-free input coupling into the hollow core optical fiber in the target tolerance range is provided.

7. The device as claimed in claim 1, wherein the at least one optical element of the pulse duration setting device comprises one of a diffraction grating, a volume Bragg grating, a prism, a grating prism, or a dispersive mirror.

8. The device as claimed in claim 1, wherein
beam parameters of the pulsed laser radiation comprise parameters of the following groups:
beam propagation parameters comprising mode field diameter, aperture angle and beam quality value,
pulse parameters comprising pulse energy, pulse duration and repetition rate, and
the beam path parameters comprising a beam center position at the first fiber end and a direction of incidence of the pulsed laser radiation to the first fiber end, and
wherein a peak power of the pulsed laser radiation is adapted by the pulse duration setting device so that, with fixedly set beam propagation parameters and fixedly set pulse parameters, an input coupling of the pulsed laser radiation into the hollow core with the beam path parameters lying in the target tolerance range is able to be carried out in a damage-free manner.

9. A system for providing laser pulses for material processing of a workpiece, the system comprising:
a laser pulse source configured to output laser pulses with a spectral width and a pulse energy for the material processing as pulsed laser radiation, the laser pulse source comprising a laser amplifier system and a pulse duration compression device,
a device for transporting the pulsed laser radiation as claimed in claim 1 comprising the hollow core optical fiber and the pulse duration setting device, and
a laser processing head configured to focus the laser pulses emerging from the hollow core optical fiber onto the workpiece for the material processing.

10. The system as claimed in claim 9, wherein the pulse duration adapting device is configured to shorten the transport pulse duration to a processing pulse duration, and wherein the pulse duration adapting device comprises at least one of a diffraction grating, a volume Bragg grating, a prism, a grating prism, or a dispersive mirror.

11. The system as claimed in claim 9, wherein the device for transporting the pulsed laser radiation is configured so that, without lengthening of the initial pulse duration, or with a dispersively maximum possible compression of the laser pulses, the pulse energy at the first fiber end leads to a peak power that causes damage to the hollow core optical fiber.

12. A method for transporting pulsed laser radiation, the method comprising:
generating, using a laser pulse source, the pulsed laser radiation comprising laser pulses with an initial pulse duration,
providing a hollow core optical fiber having a hollow core surrounded by a material,
determining a maximum peak pulse power for input coupling the pulased laser radiation into the hollow core optical fiber,
setting a peak power of the pulsed laser radiation that is present at a first fiber end of the hollow core optical fiber to be equal to or less than the maximum peak pulse power, and
coupling the pulsed laser radiation into the hollow core optical fiber at the first fiber end, wherein the setting the peak power of the pulsed laser radiation is performed by lengthening the initial pulse duration to a transport pulse duration or by non-maximum compressing the initial pulse duration using a pulse duration setting device, so that the input coupling of the laser pulses with the transport pulse duration into the hollow core is provided for transporting the laser pulses from the first fiber end to a second fiber end of the hollow core optical fiber with beam path parameter values in a target tolerance range.

13. The method as claimed in claim 12, wherein the lengthening of the initial pulse duration to the transport pulse duration is based on a stretching factor of at least 1.5, and the coupling of the laser pulses into the hollow core optical fiber is achieved by using a fiber input coupling device that provides a beam path for the pulsed laser radiation, the beam path providing the beam path parameter values in the target tolerance range at the first fiber end for damage-free input coupling into the hollow core optical fiber with the transport pulse duration.

14. The method as claimed in claim 12, further comprising:

coupling the pulsed laser radiation out of the hollow core optical fiber, shortening a pulse duration of laser pulses of the pulsed laser radiation coupled out of the hollow core optical fiber from the transport pulse duration to a processing pulse duration, and focusing the coupled-out pulsed laser radiation for the material processing of a workpiece.

15. A device for transporting pulsed laser radiation-, the device comprising:

a pulse duration compression device configured for receiving the pulsed laser radiation and for setting a transport pulse duration of laser pulses of the pulsed laser radiation, a hollow core optical fiber having a hollow core surrounded by a material, wherein the hollow core optical fiber is configured to transport the laser pulses that are coupled in at a first fiber end in the hollow core to a second fiber end and outputs the laser pulses from the second fiber end, and the hollow core optical fiber is configured to be operated with beam path parameter values that are present at the first fiber end and lie in a target tolerance range, and a fiber input coupling device configured to receive the pulsed laser radiation set to the transport pulse duration and to couple the pulsed laser radiation into the hollow core optical fiber with the beam path parameter values that lie in the target tolerance range, wherein the pulse duration compression device is configured to compress the laser pulses of the pulsed laser radiation to the transport pulse duration so that input coupling of the pulsed laser radiation into the hollow core is provided for all of the beam path parameter values in the target tolerance range.

16. A device for transporting pulsed laser radiation, the device comprising:

a pulse duration setting device configured for receiving the pulsed laser radiation and for setting a transport pulse duration of laser pulses of the pulsed laser radiation, a hollow core optical fiber having a hollow core surrounded by a material, wherein the hollow core optical fiber is configured to transport the laser pulses that are coupled in at a first fiber end in the hollow core to a second fiber end and outputs the laser pulses from the second fiber end, and the hollow core optical fiber is configured to be operated with beam path parameter values that are present at the first fiber end and lie in a target tolerance range, and a fiber input coupling device configured to receive the pulsed laser radiation set to the transport pulse duration and to couple the pulsed laser radiation into the hollow core optical fiber with the beam path parameter values that lie in the target tolerance range, wherein the pulse duration setting device is configured to compress the laser pulses of the pulsed laser radiation to the transport pulse duration so that input coupling of the pulsed laser radiation into the hollow core is provided for all of the beam path parameter values in the target tolerance range.

* * * * *